Patented Sept. 20, 1932

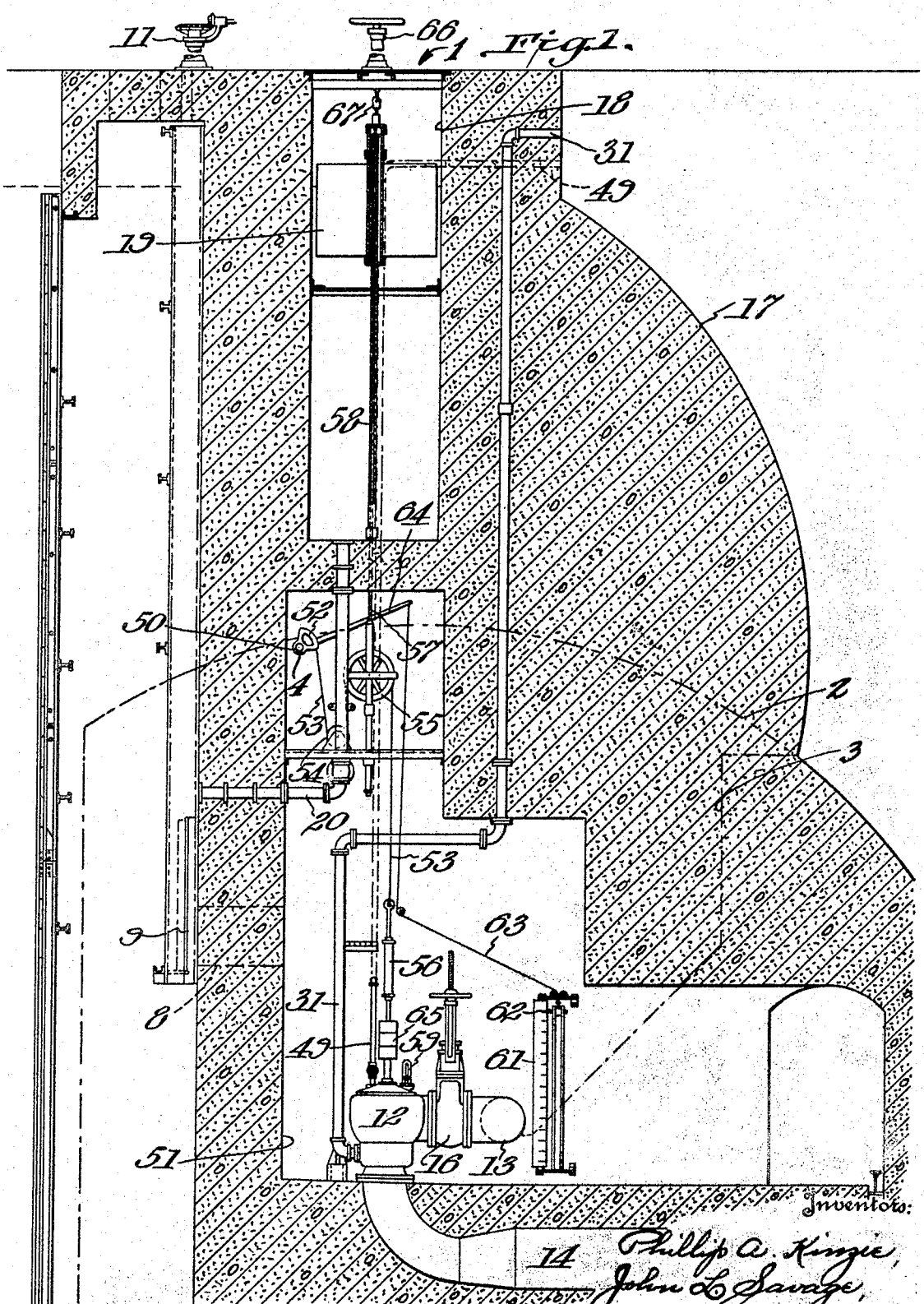

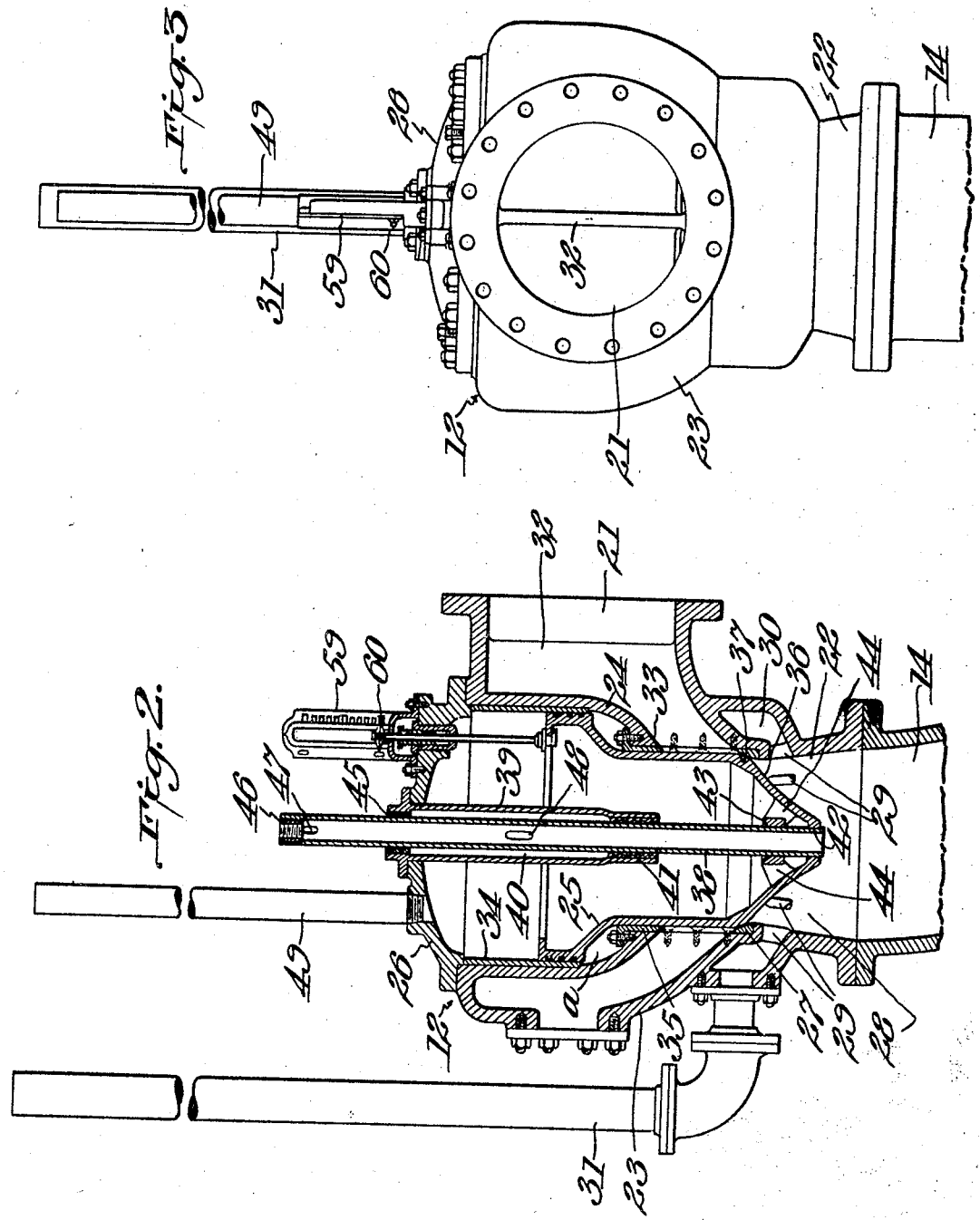

1,878,150

UNITED STATES PATENT OFFICE

PHILLIP A. KINZIE AND JOHN L. SAVAGE, OF DENVER, COLORADO, ASSIGNORS TO UNIVERSAL HYDRAULIC CORPORATION, OF DENVER, COLORADO, A CORPORATION OF COLORADO

FLUID FLOW CONTROL APPARATUS

Application filed August 11, 1928. Serial No. 298,961.

This invention relates, broadly, to a device for so controlling the flow of a fluid as to effect appropriate actuation of instrumentalities whereby the level of a body of fluid may be maintained substantially constant.

More specifically, the invention relates to apparatus for automatically controlling the position of a drum gate, such as will be hereinafter described, a ring gate, such as that disclosed in our copending application for patent for fluid handling and controlling apparatus, filed August 11, 1928, Serial No. 298,962, or other gate or abutment preferably of the floating or semi-floating type over which water may flow, as from a reservoir, so that for any increase or decrease in the quantity of water entering the reservoir with the resultant tendency of the level of the water therein to rise or drop, the gate or the like will automatically adjust itself so that its crest will assume a position to permit discharge of water from the reservoir in such quantities as to maintain the water level in the reservoir substantially constant.

The principal object of the invention is the provision of a valve which, having been once adjusted to meet existing conditions of service, operates automatically in response to changes in fluid pressure acting upon its parts to control the flow of fluid in the line in which the valve is inserted.

In the accompanying drawings, in the several figures of which like parts are similarly designated, Fig. 1 is a sectional elevation, of the dam and control chamber, and gate control apparatus embodying our invention.

Fig. 2 is an enlarged central vertical section of the control valve.

Fig. 3 is an elevation of the control valve viewed from its inlet side.

In order that an idea may be had as to the practical nature of our invention and in order to clearly disclose the construction and operation of the same, a description of one application of the valve is given below and shown in Fig. 1.

A dam 1 is provided with a gate 2 serving to a gate chamber 3, the gate being mounted on a pivot 4 for rotation between closed and open positions.

Water is introduced into the gate chamber 3 through a conduit 8 in communication with the water in the reservoir and controlled by a suitable gate or other valve 9 adjustable by means of a rod 10 and operating mechanism 11.

The escape of water from the gate chamber 3, and hence the pressure therein acting upon the gate is determined by a control valve 12, which forms the main feature of our invention. Water is admitted to this valve through a pipe 13 in communication with the gate chamber, and escapes through the valve in a predetermined automatic manner into a conduit 14 which may empty at 15 below the dam or at any other point where it is in communication with the atmosphere.

The pipe 13 is provided with a valve 16 whereby it may be closed when it is necessary or desirable to remove, replace or repair the valve 12 without emptying the gate chamber 3 or lowering the water in the reservoir.

Formed in a pier 17, adjacent to and preferably forming a part of the dam structure, is a float well 18 in vertical axial alinement with the valve 12, and in this well is arranged a float 19. The float well is in communication with the water in the reservoir through a conduit 20 (Fig. 1) whereby the level of water in the float well will always be coincident with the level of water in the rservoir.

The control valve 12 is the principal unit in the apparatus for controlling the operation of the drum gate in response to variations in level of the water in the reservoir incident to variations in the rate or quantity of water flowing into the reservoir. As previously stated, the inlet 21 of the valve is connected with the gate chamber through a valved pipe 13, and its outlet or discharge 22 is connected with a conduit 14 open to atmospheric pressure below the dam.

The valve 12 has a body 23 in which the inlet and discharge openings 21 and 22 are formed, an inner cylinder 24 preferably cast integrally with the body and concentric with the discharge opening 22, a differential plunger or piston 25 slidable in the inner cylinder 24 and responsive to variations in pressure within the valve, a cylinder head 26, and control apparatus, later described in detail, arranged on the vertical axis of the valve and concentric with the inner cylinder 24.

The shape of the valve body 23 with relation to the inner cylinder 24 is such that the water flowing through the valve is evenly distributed and the velocity of the water around the inner cylinder is practically uniform.

In the lower portion of the valve body 23 adjacent to the discharge opening 22 is placed a renewable seat ring 27, preferably of non-corrodible metal. In the throat 28, immediately below the ring 27, we provide a set of annularly arranged ports 29 communicating with an annular cavity 30 which latter is in communication through an air-vent pipe 31 with the atmosphere at a point above the dam (see Fig. 1) and above the maximum level of the water in the reservoir. By means of this pipe 31 air is admitted through the annular cavity 30 and ports 29 to the discharge opening 22 immediately below the seat ring 27, thus destroying any tendency for the formation of a vacuum at this point by the high velocity of the water passing through the valve when the quantity of same is sufficient to fill the outlet conduit 14 and prevent admission of air to the throat 28 through any unfilled portion of this conduit. The prevention of a vacuum at this point prevents damage to the valve due to surges and vibration.

The inner cylinder 24 is, as stated, concentric with the vertical axis of the valve body and is rigidly, integrally supported therein by appropriately disposed ribs 32, and is closed at its upper end by the dome-shaped head 26. The lower portion 33 of cylinder 24 is of smaller diameter than its upper portion to accommodate the differential shape of the plunger or piston 25, and the interior of the cylinder may be provided with liners 34 and 35 or it may be exactly machined to provide a perfect sliding fit for the piston.

The lowermost portion of the piston 25 is contracted to conical form, as shown at 36, and is provided with a machined seat at 37 to provide a sealing contact with the seat ring 27 when the piston is in its lowest position, thus effecting a tight closure of the valve.

The movement of the piston 25, and hence the operation of the valve, is controlled by a slidable pressure varying device in the form of a tube 38 arranged axially of the valve and partially encased and guided in its movement by a sleeve 39 extending downwardly from and supported by the head 26. This sleeve 39 forms an annular space 40 around the tube 38 throughout the major portion of its length and is provided at its end with a guide 41. The lower end of the tube 38 is open and extends through an opening 42 in the conical end 36 of the piston with a close sliding fit and is guided by a bearing 43 supported by ribs 44 in the end of the piston. The upper end of the tube 38 extends above the top of the head 26, through a packing gland 45, and is closed by a plug 46 which forms a means for connecting the tube with the valve adjusting mechanism. Ports 47 adjacent to the upper end of the tube 38 open its interior to the atmosphere. Similar ports 48 lower down the tube afford communication between its interior and the annular space 40, whereby any leakage past the guide 41 and into the space 40 may be taken care of through the tube. Moreover, due to the established clearance between the tube and the guide, the inner chamber of the valve is always in communication with the annular space 40. It will be understood that the ports 47 are never closed, during normal operation of the valve.

A pipe 49 extending to a point above the maximum level of water in the reservoir furnishes communication between the inner cylinder and the atmosphere.

The upward and downward movements of the tube 38, and hence the operation of the valve, are controlled by the float 19 by means of the connections next described. At one end of the drum gate hinge 4 is arranged a shaft 50 which extends into the control compartment 51 (Fig. 3) containing the control valve and its appurtenances. This shaft 50 turns with the drum gate and carries a segmental member 52 to which is attached one end of a flexible cable 53, or the like, which runs under a fixed pulley 54 and over a floating sheave 55 carried by the float, and has its other end attached to a turnbuckle 56 or other adjusting device fastened to the tube 38. A rod 57 which connects the sheave 55 with float 19 passes upwardly through a tube 58 arranged in the float well 18, this tube extending above the maximum level which may be attained by water in the float well.

The position of the piston 25, and hence the amount of opening of the valve, is shown by an indicator 59 mounted on the valve head 26 and having its pointer 60 connected with the piston in such a manner that rotation of the piston is not restrained.

The position of the drum gate is indicated upon a scale 61 (Fig. 1) the weighted pointer 62 of which is connected by a cable 63 with an arm 64 which turns with shaft 50.

In order that any tendency of the tube 38 to stick, and hence not move freely downward, may be overcome, we provide a weight 65 bearing directly upon the upper end of the tube and movable with it.

It is to be particularly noted that all water passages of our valve are large and free and that no pipes are used for connecting the various chambers and passages of the valve. Hence the proper functioning of the valve is not apt to be interfered with by clogging of such passages or pipes with small fish or trash.

The operation of the apparatus is as follows:

With the drum gate in its open position, the gate valve 9 is so adjusted as to open the conduit 8 from five to ten percent. Valve 16 is opened to admit water from the gate chamber 3 to control valve 12, which latter is closed. The water thus admitted to the control valve will fill the valve body around the inner cylinder 24 and will find its way between the sleeve 35 and the reduced portion of the plunger or piston 25 into the annular space *a* and thence through the clearance between the enlarged differential end of the piston 25 and cylinder sleeve 34 into the interior of the piston, so that reservoir pressure is established within the inner cylinder 24 and upon the plunger or piston 25 and holds the plunger closed against its seat ring 27.

With these conditions established, the tube 38 is raised by adjustment of turnbuckle 56 (Fig. 1) until its lower end is withdrawn from the opening 42 in the conical end of the plunger, allowing water from inside the valve to escape into conduit 14 until the pressure within the valve drops to a point where the pressure in chamber *a* acting against the enlarged or differential portion of plunger 25 will raise the plunger from its seat at 27 and permit water to escape from the gate chamber through the pipe 13, throat 28, and conduit 14. The adjustment of tube 38 is continued until the amount of water discharged through the control valve, plus any leakage past the packings or seals of the drum gate, compensates for the amount of water entering the gate chamber 3 through conduit 8. In this manner a proper balancing pressure beneath the drum gate is established and the drum gate remains in fixed position so long as there is no change in the rate of flow of water into the reservoir with the attendant rise in the level of the water therein.

From the foregoing, it will be apparent that the withdrawal of the end of tube 38 from the opening 42 of the plunger or piston 25 forms an orifice at the conical extremity of the piston, and the regulation of the opening of this orifice provides a means for so balancing the pressures acting upon the interior and exterior of the piston or plunger that it will remain in any desired position so long as the hydraulic conditions remain constant.

Upon a rise of the water level in the reservoir, due to an increase in the inflow of water thereto, a corresponding rise of the water level in the float well 18 will take place and the float 19 will rise and will raise with it the floating sheave 55 which owing to the nature of its connection by means of cable 53 with tube 38, will lift the tube twice the distance moved by the float. This lifting of tube 38 increases the freedom of flow of water through the orifice at 42, decreases the pressure in the inner cylinder 24 and in the interior of the piston or plunger 25 and permits the plunger to rise under the influence of the differential pressure in annular chamber *a*, thus increasing the flow of water from the gate chamber through pipe 13, throat 28 and conduit 14, reducing the pressure acting upon the drum gate and permitting the drum gate to descend under the influence of its own weight plus the weight of the water passing over its crest, and thus increasing the discharge of water from the reservoir.

Conversely, this downward movement of the drum gate causes a corresponding rotation of the segmental member 52, and a downward movement of tube 38 due to the slackening of the cable 53. The lowering of the tube 38 reduces the flow of water through the orifice at 42, increases the pressure within the cylinder 24 and piston 25 and causes the piston to descend, thus decreasing the flow of water from the gate chamber, raising the pressure therein and arresting the descent of the drum gate.

It will be understood that the various parts of the control mechanism are so designed and connected that upon the movement of the float 19 and segmental member 52 in opposite directions the one nearly balances the other. Thus, when the rise in water level in the reservoir ceases, and the drum gate has lowered to a position which will permit discharge of water from the reservoir at the same rate as that at which it enters the reservoir, the pressures internally and externally of the plunger or piston 25 automatically balance and the drum gate remains in its newly adjusted position until there is a further change in the flow of water into the reservoir with its attendant raising or lowering of the water level therein, as the case may be.

If the flow of water into the reservoir should decrease, causing a lowering of the water level therein, the sequence of operations just described for a rise in water level will be reversed. The float 18 will lower, thus lowering tube 38, decreasing the flow through the orifice at 42, causing plunger 25 to lower in response to the building up of pressure within it, and decreasing the rate of flow of water from the gate chamber with the attendant building up of pressure therein acting upon the drum gate to raise it until the predetermined level of water in the reservoir is again established. The pressures in the control valve 12 then again become balanced, the pressure of water in the gate chamber acting upon the drum gate is stabilized and the gate remains fixed in position until there is a further change in water level in the reservoir.

There must be a definite fixed relation between the position of the gate 9 of conduit 8 and the operating position of the piston or plunger 25 of control valve 12. The position of gate 9, and hence the rate of flow of water from the reservoir through conduit 8 into gate chamber 3, and the relative adjustment of the control valve 12 and its operating mechanism, must be determined by trial, and when a satisfactory adjustment of the gate 9 has been attained the gate should be securely locked in adjusted position so that it cannot be tampered with and the automatic functioning of the control apparatus disturbed.

Hand control of the drum gate may be effected by means of a hand wheel hoist 66 connected to the rod 57 by a chain 67 which latter hangs loose during automatic operation.

It will thus be seen that we provide, by our invention, apparatus of a simple, compact and sturdy nature, for effecting the automatic operation of buoyant or semi-buoyant gates or other devices for controlling the flow of fluids, same being responsive to changes in level of such fluids and functioning automatically to maintain such level substantially constant.

It will be noted, moreover, that the control valve, which is the salient feature of our invention, operates automatically in response to changes in fluid pressure acting upon its parts, and having been once adjusted to meet existing conditions of service will thereafter function automatically without further adjustment or attention.

Various changes are deemed to be within the spirit of the invention and the scope of the following claims.

We claim:

1. A valve for fluid flow control apparatus, comprising a valve body having an inlet opening and an outlet opening, a cylinder arranged within said body, a piston slidable within said cylinder and adapted to control communication between said openings, means including said cylinder for confining a pressure fluid interiorly and exteriorly of said piston to impart valve closing and opening movement thereto respectively, means associated with said piston for controlling escape of fluid from the cylinder to vary the pressures effective upon said piston and permit automatic adjustment of said piston to vary its control effect between said openings, and means affording communication between said outlet opening and the atmosphere whether said valve be closed or open.

2. A valve for fluid flow control apparatus, comprising a valve body having an inlet opening and an outlet opening, a cylinder arranged within said body, a piston slidable within said cylinder and adapted to control communication between said openings, means including said cylinder for confining a pressure fluid interiorly and exteriorly of said piston to impart valve closing and opening movement thereto respectively, means associated with said piston for controlling escape of fluid from the cylinder to vary the pressures effective upon said piston and permit automatic adjustment of said piston to vary its control effect between said openings, and means including a chamber in said body adjacent to said outlet opening and affording communication between said outlet opening and the atmosphere whether said valve be closed or open.

3. A valve for fluid flow control apparatus, comprising a valve body having an inlet opening and an outlet opening, a valve seat in said outlet opening, a cylinder arranged within said body, a piston slidable within said cylinder and adapted for cooperation with said seat to control communication between said openings, means including said cylinder for confining a pressure fluid interiorly and exteriorly of said piston to impart valve closing and opening movement thereto respectively, means associated with said piston for controlling escape of fluid from the cylinder to vary the pressures effective upon said piston and permit automatic adjustment of said piston to vary its control effect between said openings, and means including a chamber in said body and apertures communicating therewith and with the outlet opening below said seat for affording communication between said outlet opening and the atmosphere whether said valve be closed or open.

4. A valve for fluid flow control apparatus, comprising a valve body having an inlet opening and an outlet opening, a cylinder arranged within said body, a piston slidable within said cylinder to control communication between said openings, means for venting the interior of said cylinder to the atmosphere, and means for venting said outlet opening to the atmosphere whether said valve be closed or open.

5. A valve for fluid flow control apparatus, comprising a valve body having an inlet opening and an outlet opening, a cylinder arranged within said body, a piston slidable within said cylinder and adapted to control communication between said openings, means including said cylinder for confining a pressure fluid interiorly and exteriorly of said piston to impart valve closing and opening movement thereto respectively, and means including a tubular member open to the atmosphere and adjustable to control escape of pressure fluid from the interior of the piston, said tubular member serving to thus regulate movement of said piston in response to relative variations in the pressure of fluid interiorly and exteriorly thereof and to vent said outlet opening to atmosphere.

6. A valve for fluid flow control apparatus, comprising a valve body having an inlet opening and an outlet opening, a cylinder arranged within said body, a piston slidable within said cylinder and adapted to control communication between said openings, a seat in said body adjacent to said outlet opening and with which said piston cooperates, means including said cylinder for confining a pressure fluid interiorly and exteriorly of said piston to impart valve closing and opening movement thereto respectively, means including a tubular member open to the atmosphere and adjustable to control escape of pressure fluid from the interior of the piston, said tubular member serving to thus regulate movement of said piston in response to relative variations in the pressure of fluid interiorly and exteriorly thereof, and means adjacent to said seat, and cooperating with said tubular member in venting said outlet opening to the atmosphere.

7. In a valve for fluid flow control apparatus, the combination with a valve body having an inlet opening and an outlet opening, of a cylinder carried by said body, a piston slidable in said cylinder and adapted to control communication between said openings, and means for supplying atmospheric air to said cylinder and to said outlet opening to prevent the formation of a vacuum tending to impede desired movements of said piston.

8. A needle valve comprising a body having an inlet and an outlet opening, a cylinder within said body, a needle slidable in said cylinder to control fluid flow through said outlet opening, means including said cylinder and needle defining chambers for receiving pressure fluid for actuating said needle, said needle having an opening through the nose thereof, and a vent tube carried by said body and having an open end located within said outlet opening, said tube having a sliding fit within the opening in said needle nose and cooperating therewith to form a valve controlling the escape of pressure fluid from one of said pressure chambers.

9. The invention as set forth in claim 8, wherein said tube is slidably mounted within a tubular sleeve secured to said body, in combination with packing means at the ends of said tubular sleeve, and an opening through the wall of said tube between said packing means, whereby pressure fluid leaking past said packing means is drained from said tubular sleeve through said tube.

10. A fluid flow control valve comprising, a body having inlet and outlet chambers, a cylindrical guide in said body, a needle slidable in said cylindrical guide for controlling the flow of fluid through said body and means including a conduit leading from said outlet chamber for supplying sufficient air to said outlet chamber upon the closing movement of said needle to insure against a vacuum induced closure of said valve.

11. A needle valve comprising a body having inlet and outlet openings, a cylinder within said body, a needle slidable in said cylinder for controlling fluid flow through said outlet opening, a chamber in said body adjacent said outlet opening and communicating therewith, said chamber being adapted to communicate with atmosphere, and a vent tube carried by said body and extending into said needle, said tube having an open end located within said outlet opening.

In testimony whereof, we affix our signatures.

PHILLIP A. KINZIE.
JOHN L. SAVAGE.